(12) United States Patent
Patel et al.

(10) Patent No.: US 10,439,953 B2
(45) Date of Patent: Oct. 8, 2019

(54) SYSTEM AND METHOD FOR PARTITION MIGRATION IN A MULTITENANT APPLICATION SERVER ENVIRONMENT

(71) Applicant: ORACLE INTERNATIONAL CORPORATION, Redwood Shores, CA (US)

(72) Inventors: Chanda Patel, Milpitas, CA (US); Rajiv Mordani, Sunnyvale, CA (US); Nazrul Islam, Santa Clara, CA (US); Joseph Dipol, Sunnyvale, CA (US); Martin Mares, Prague (CZ); Trilok Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/748,148

(22) Filed: Jun. 23, 2015

(65) Prior Publication Data
US 2015/0372938 A1    Dec. 24, 2015

Related U.S. Application Data

(60) Provisional application No. 62/016,035, filed on Jun. 23, 2014, provisional application No. 62/055,106, filed on Sep. 25, 2014.

(51) Int. Cl.
*H04L 12/911* (2013.01)
*H04L 29/08* (2006.01)
(Continued)

(52) U.S. Cl.
CPC ............ *H04L 47/70* (2013.01); *G06F 9/5077* (2013.01); *G06F 9/5088* (2013.01); *H04L 45/04* (2013.01); *H04L 67/10* (2013.01)

(58) Field of Classification Search
CPC ......... H04L 67/10; H04L 41/12; H04L 47/70; H04L 67/42; H04L 41/0893; H04L 63/20;
(Continued)

(56) References Cited

U.S. PATENT DOCUMENTS 6,959,370 B2 * 10/2005 Shaw ............... G06F 12/08
711/165
2011/0125979 A1    5/2011 Kancharla
(Continued)

FOREIGN PATENT DOCUMENTS

CN    101639835    2/2010
CN    102170457    8/2011
(Continued)

OTHER PUBLICATIONS

Elmore, et al., Zephyr: Live Migration in Shared Nothing Databases for Elastic Cloud Platforms, Jun. 12, 2011, 12 pages.
(Continued)

*Primary Examiner* — Chris Parry
*Assistant Examiner* — Chouat Abderrahmen
(74) *Attorney, Agent, or Firm* — Tucker Ellis LLP (57) ABSTRACT

In accordance with an embodiment, described herein is a system and method for partition migration in a multitenant application server environment. Each resource group, or partition which includes that resource group, can be associated with a virtual target (e.g., virtual host) information that defines a target to which that resource group or partition should be targeted and deployed. A web tier component (e.g., Oracle Traffic Director) includes a routing information, which maps the virtual target for a partition to a corresponding target such as a server or cluster, so that requests for that partition are directed to the appropriate target, for example as part of one or more sessions. When a partition is migrated, session information is replicated between an original target
(Continued)

and a new target, and the web tier component provided with a revised routing information, so that subsequent requests for that partition are directed to the new target.

20 Claims, 8 Drawing Sheets

(51) Int. Cl.
*H04L 12/715* (2013.01)
*G06F 9/50* (2006.01)

(58) Field of Classification Search
CPC ............ H04L 67/1025; H04L 41/0843; H04L 63/0428; H04L 67/02; H04L 41/20; H04L 41/22; H04L 47/783; H04L 63/105; H04L 41/0816; H04L 67/1097; H04L 41/0846; H04L 41/0863; H04L 67/06; H04L 67/1095; H04L 67/2804; H04L 67/34; H04L 29/06; H04L 29/08846; H04L 45/586; H04L 69/32; G06F 9/5077; G06F 8/41; G06F 21/53; G06F 12/145; G06F 8/34; G06F 9/45558; G06F 9/50; G06F 9/5072; G06F 12/1491; G06F 17/30584; G06F 8/20; G06F 8/451; G06F 8/60; G06F 8/65; G06F 9/4411; G06F 9/44505; G06F 13/00; G06F 13/24; G06F 13/4081; G06F 13/409; G06F 9/5011; G06F 9/4856; G06F 11/3409; G06F 9/45533; G06F 11/3428; G06F 2009/4557; G06F 2201/88; G06F 9/455; G06F 9/5083; G06F 3/067; G06F 9/5088; G06F 11/1446; G06F 11/2015; G06F 11/2023; G06F 11/203; G06F 11/2035; G06F 11/2046; G06F 11/34; G06F 12/12; G06F 12/127; G06F 15/177; G06F 2009/45562; G06F 2209/501; G06F 2209/5022; G06F 3/0619; G06F 3/065; G06F 3/0664; G06F 3/0665; G06F 3/0683; G06F 9/45537; G06F 9/4862; G06F 9/5027; G06F 9/505; G06F 2009/45579; G06F 3/0604; G06F 3/0605; G06F 3/0607; G06F 3/0631
USPC ....... 709/226, 223, 203, 224, 204, 206, 220, 709/221, 202, 215, 238
See application file for complete search history.

(56) References Cited

U.S. PATENT DOCUMENTS

| | | | |
|---|---|---|---|
| 2011/0213870 A1 | 9/2011 | Cai | |
| 2011/0265168 A1* | 10/2011 | Lucovsky | ........... H04L 63/0245 726/7 |
| 2012/0072597 A1 | 3/2012 | Teather | |
| 2012/0072893 A1* | 3/2012 | Gupta | ........................ G06F 8/65 717/168 |
| 2012/0110566 A1 | 5/2012 | Park | |
| 2012/0215775 A1* | 8/2012 | Allen | ..................... G06Q 30/02 707/728 |
| 2013/0086235 A1* | 4/2013 | Ferris | ...................... G06F 9/505 709/223 |
| 2013/0103639 A1* | 4/2013 | Greenberg | ................ G06F 9/44 707/608 |
| 2013/0326506 A1 | 12/2013 | McGrath et al. | |
| 2013/0326507 A1 | 12/2013 | McGrath | |
| 2014/0068207 A1* | 3/2014 | Aslot | ...................... G06F 12/12 711/160 |
| 2014/0136688 A1 | 5/2014 | Kopri | |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |
| CN | 104462389 | 3/2015 |
| JP | 2011233146 | 11/2011 |

OTHER PUBLICATIONS

Periasamy, Performance Optimization in Cloud Computing Environment, Oct. 11, 2012, 6 pages.
International Searching Authority at the European Patent Office, International Search Report Written Opinion for PCT International Application No. PCT/US2015/037264, dated Sep. 24, 2015, 11 pages.
European Patent Office, Office Action dated Jan. 25, 2018 for Application No. 15733990.4, 6 pages.
Chinese Patent Office, Office Action dated Jul. 20, 2018 for Application No. 201580003512.6, 8 pages.
European Patent Office, International Searching Authority, International Search Report and Written Opinion dated Apr. 24, 2015 for International Patent Application No. PCT/US2015/012268, 10 pages.
Japanese Office Action for Japanese Application No. 2016-575054 dated Jan. 15, 2019, 4 pages.
Chinese Office Action for Chinese Application No. 201580033971.9 dated Mar. 4, 2019, 9 pages.
United States Patent and Trademark Office, Notice of Allowance dated Aug. 9, 2019 for U.S. Appl. No. 15/948,721, 18 Pages.

* cited by examiner

SYSTEM AND METHOD FOR PARTITION MIGRATION IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR PARTITION MIGRATION IN A MULTITENANT APPLICATION SERVER ENVIRONMENT", Application No. 62/016,035, filed Jun. 23, 2014; and U.S. Provisional Application titled "SYSTEM AND METHOD FOR PARTITION MIGRATION IN A MULTITENANT APPLICATION SERVER ENVIRONMENT", Application No. 62/055,106, filed Sep. 25, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", Application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for partition migration in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for partition migration in a multitenant application server environment. Each resource group, or the partition which includes that resource group, can be associated with a virtual target (e.g., virtual host) information that defines a target to which that resource group or partition should be targeted and deployed. A web tier component (e.g., Oracle Traffic Director) includes a routing information, which maps the virtual target for a particular partition to a corresponding target such as a server or cluster, so that requests for that partition are directed to the appropriate target, for example as part of one or more sessions. When a particular partition is migrated, session information is replicated between an original target and a new target, and the web tier component provided with a revised routing information, so that subsequent requests for that partition are directed to the new target.

DETAILED DESCRIPTION

In accordance with an embodiment, described herein is a system and method for partition migration in a multitenant application server environment. Each resource group, or the partition which includes that resource group, can be associated with a virtual target (e.g., virtual host) information that defines a target to which that resource group or partition should be targeted and deployed. A web tier component (e.g., Oracle Traffic Director) includes a routing information, which maps the virtual target for a particular partition to a corresponding target such as a server or cluster, so that requests for that partition are directed to the appropriate target, for example as part of one or more sessions. When a particular partition is migrated, session information is replicated between an original target and a new target, and the web tier component provided with a revised routing information, so that subsequent requests for that partition are directed to the new target.

Application Server (e.g., Multi-Tenant, MT) Environment

Figure 1:
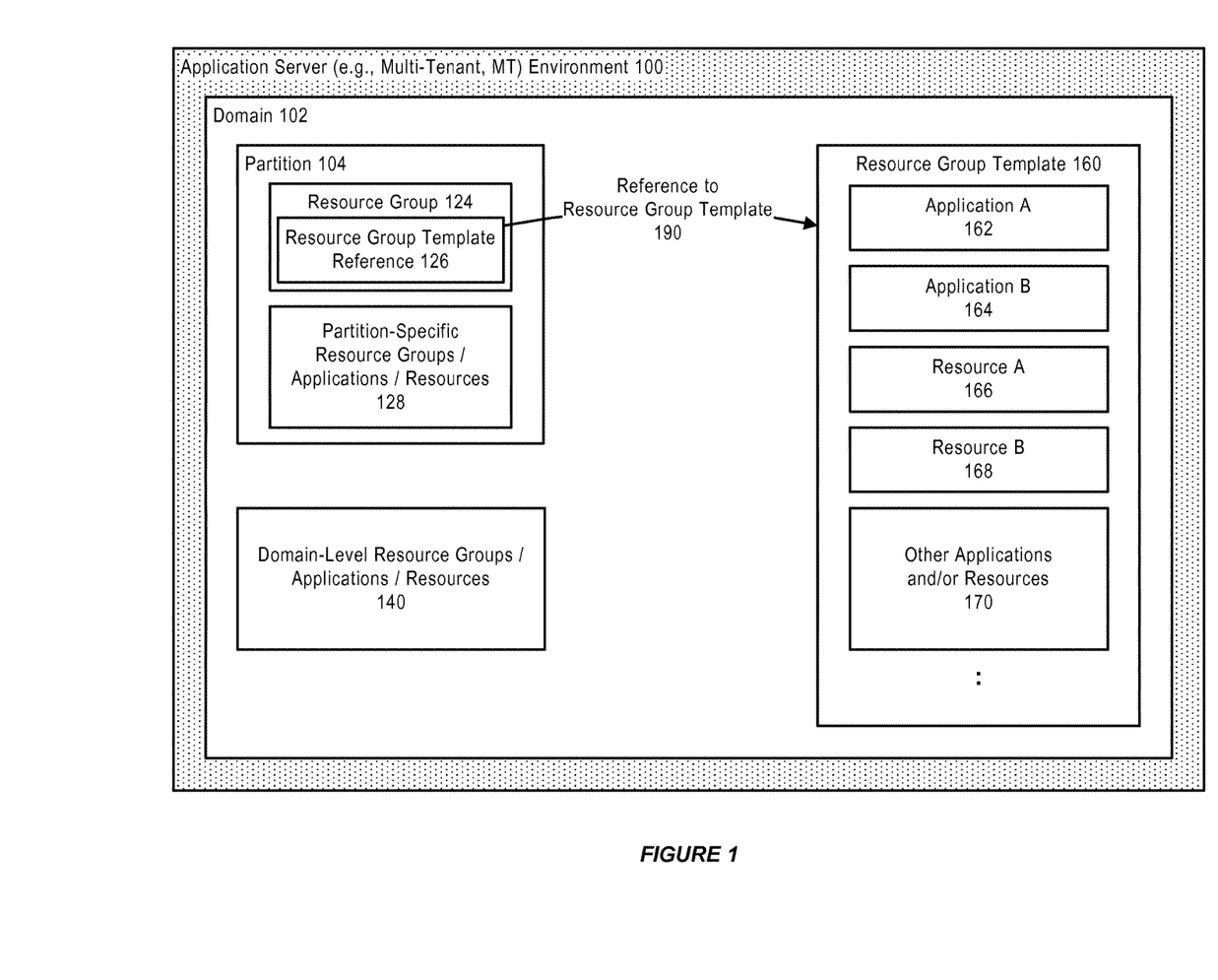
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
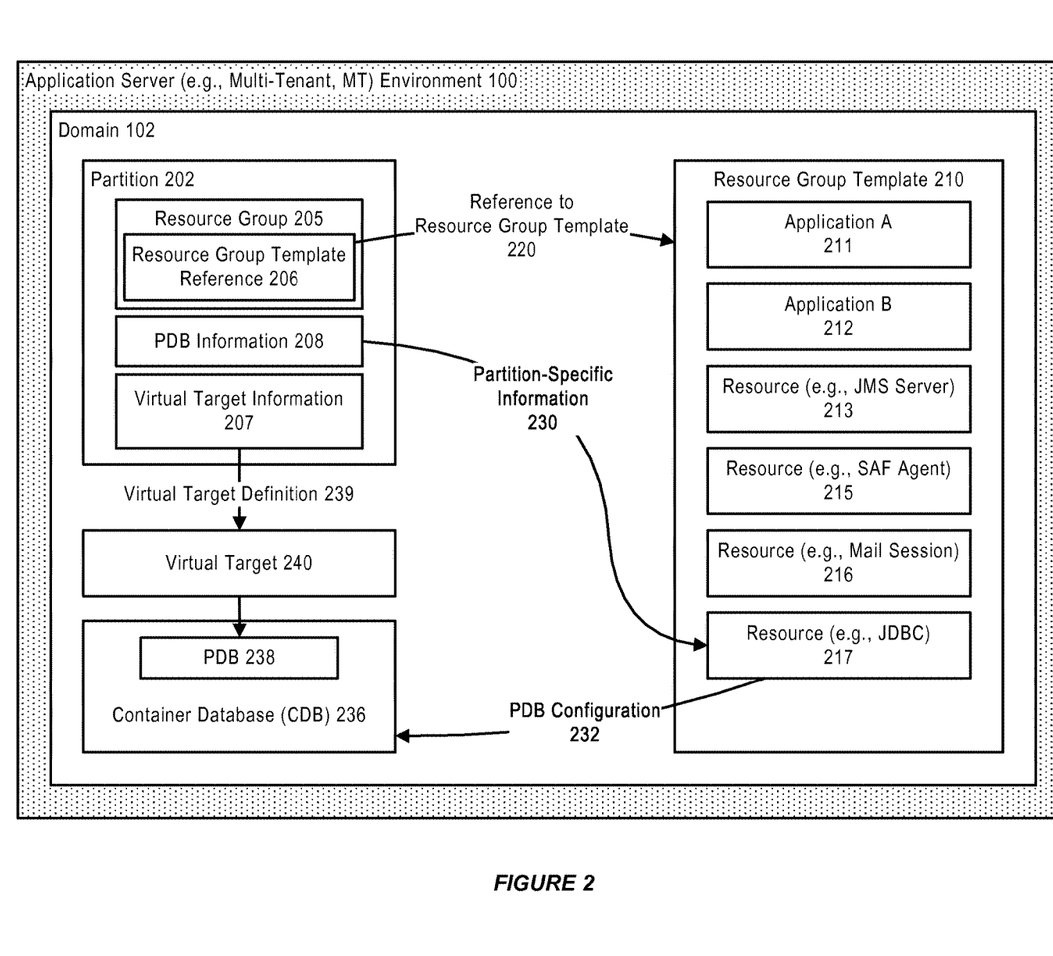
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
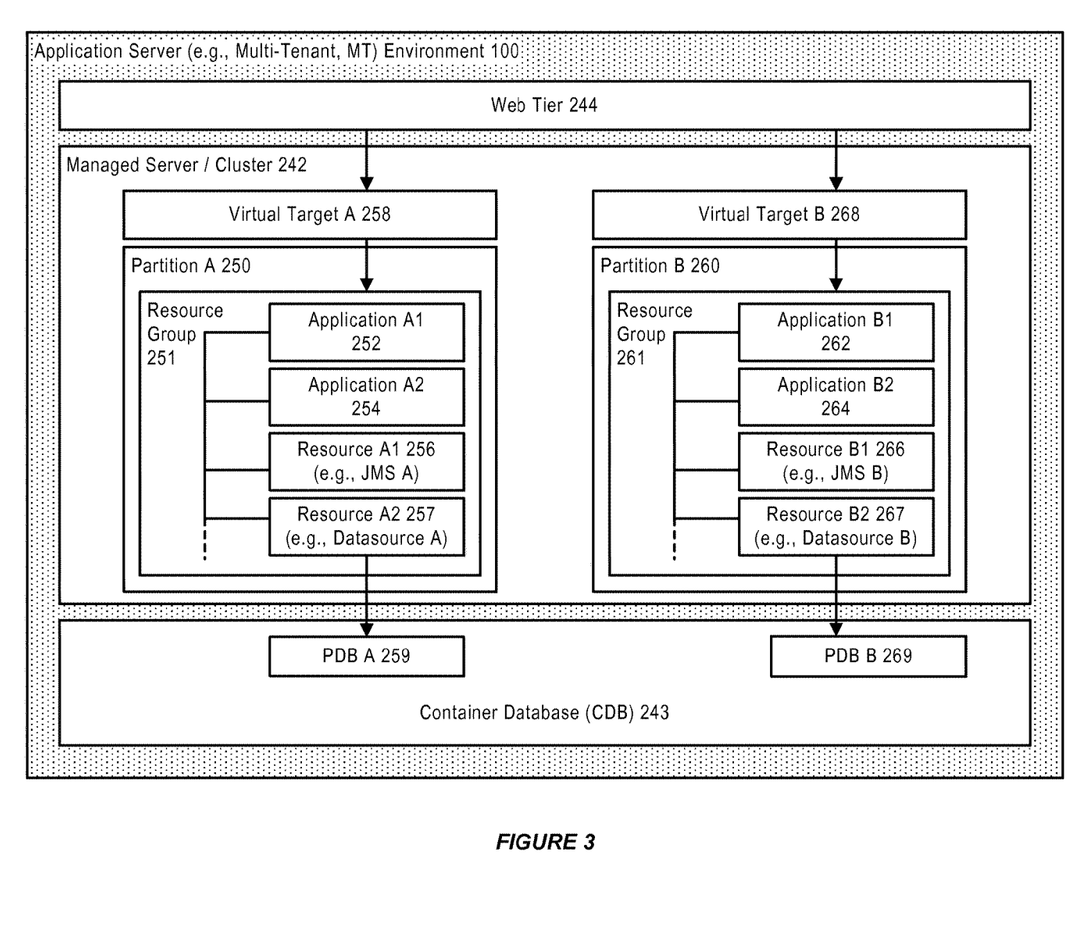
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
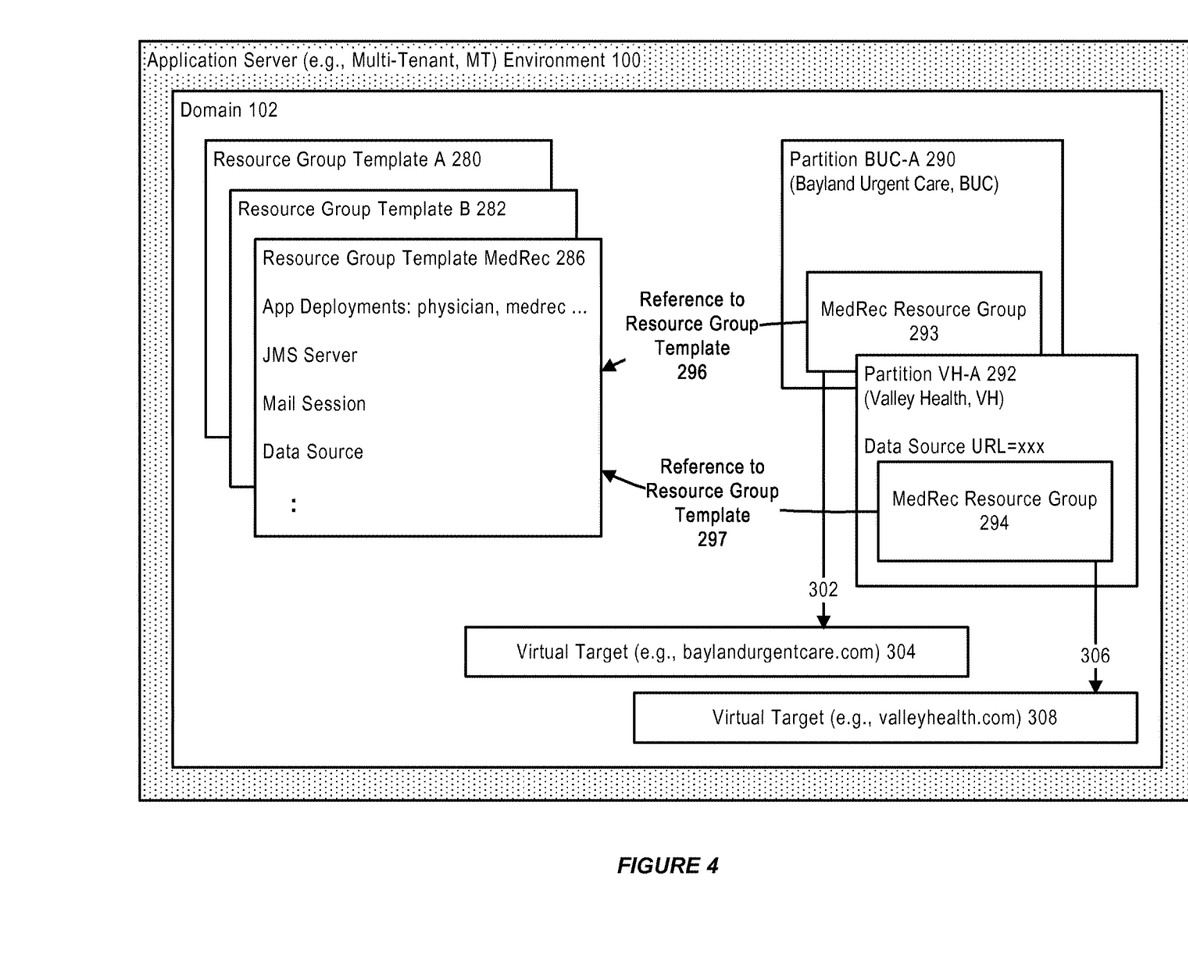
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
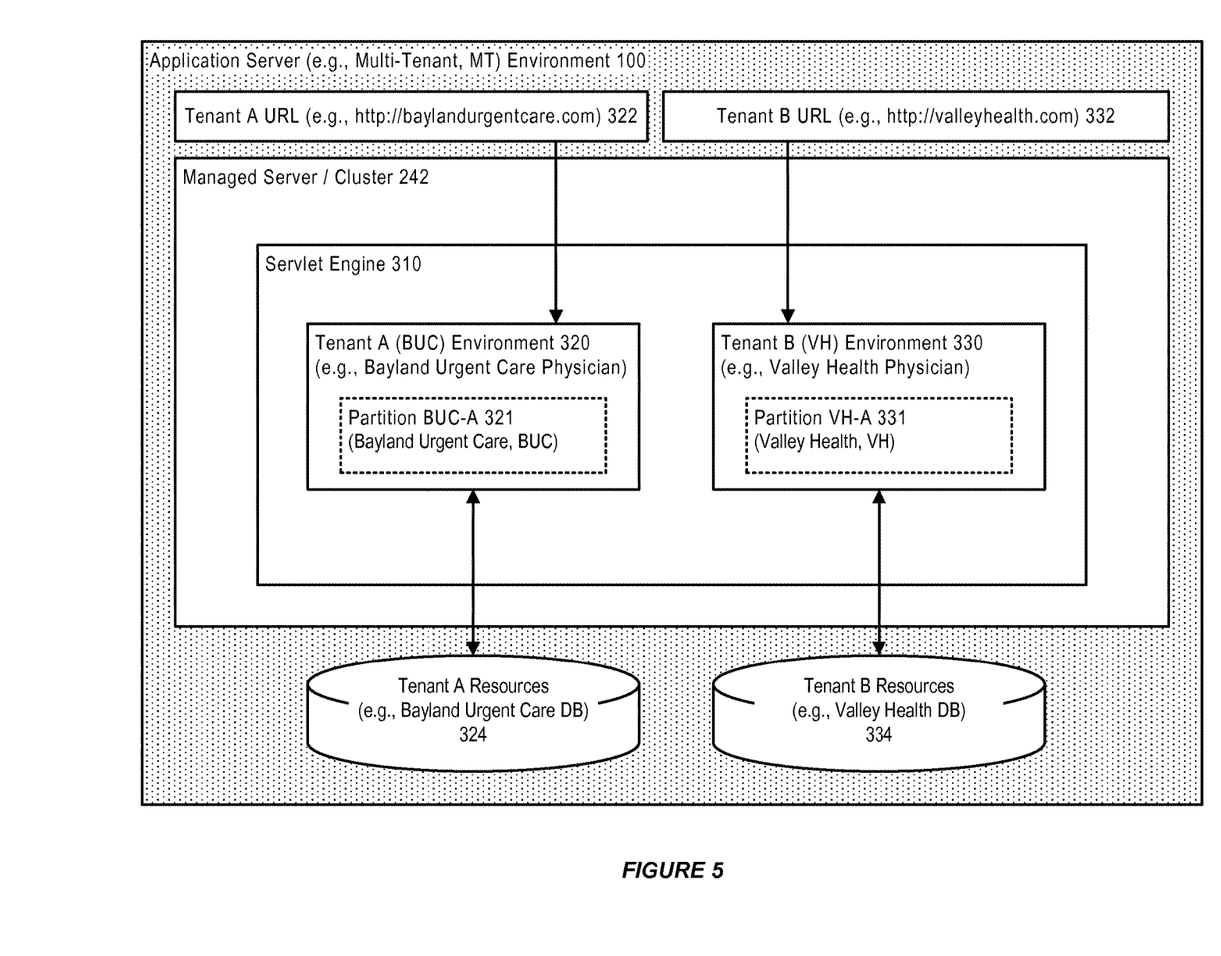
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Partition Migration

In accordance with an embodiment, described herein is a system and method for partition migration in a multitenant application server environment. Each resource group, or the partition which includes that resource group, can be associated with a virtual target (e.g., virtual host) information that defines a target to which that resource group or partition should be targeted and deployed. A web tier component (e.g., Oracle Traffic Director) includes a routing information, which maps the virtual target for a particular partition to a corresponding target such as a server or cluster, so that requests for that partition are directed to the appropriate target, for example as part of one or more sessions. When a particular partition is migrated, session information is replicated between an original target and a new target, and the web tier component provided with a revised routing information, so that subsequent requests for that partition are directed to the new target.

In accordance with an embodiment, partition migration can be used to provide a seamless migrations, including preserving the state of sessions associated with a partition when the partition is migrated from one target to another target. This can be useful, for example, in ensuring that a customer application is not disrupted due to problems with the underlying computing infrastructure.

Figure 6:
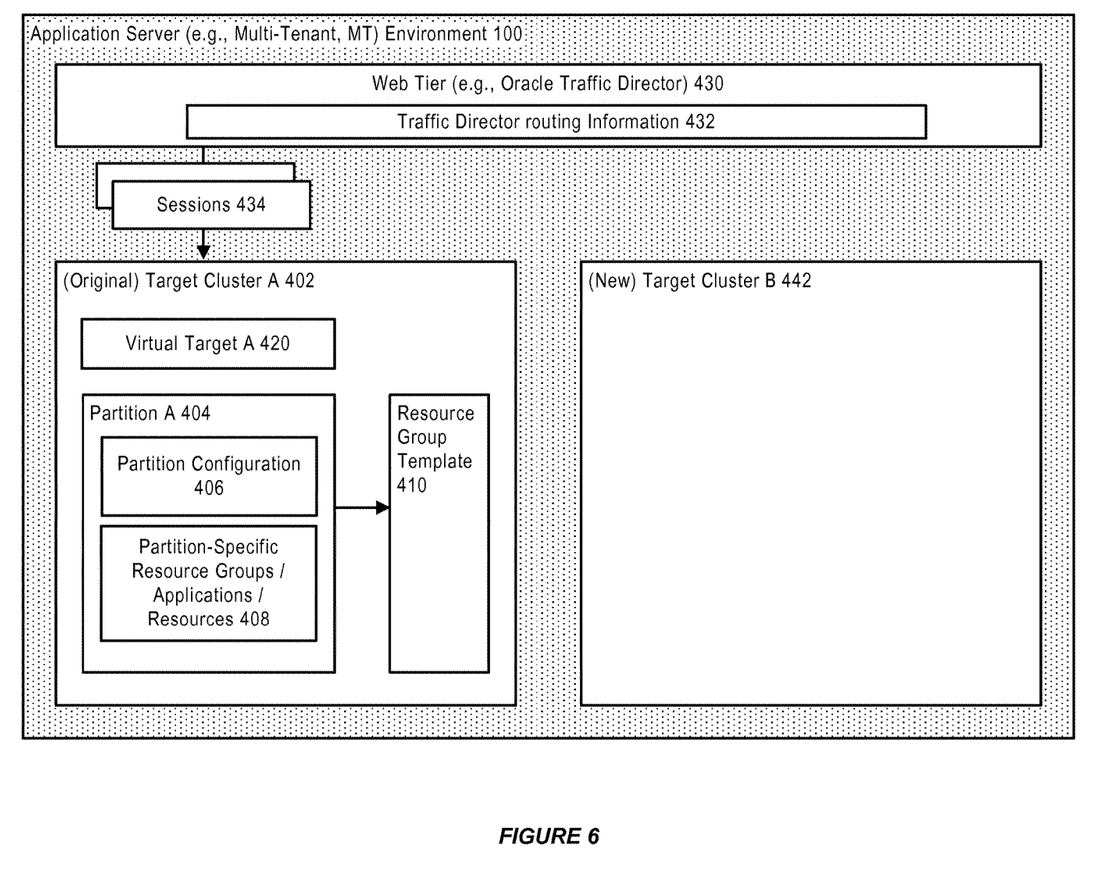
FIG. 6 illustrates the use of partition migration in an application server, cloud, or other environment, in accordance with an embodiment.

FIG. 6 illustrates the use of partition migration in an application server, cloud, or other environment, in accordance with an embodiment. As shown in FIG. 6, in accordance with an embodiment, a first or original target cluster A 402 can include one or more partitions including a particular partition A 404, which is associated with a partition configuration 406 and one or more partition-specific resource groups, applications or resources 408.

Optionally, the partition can reference a resource group template 410.

Each resource group, or the partition which includes that resource group, can be associated with a virtual target (e.g., virtual host) information that defines a target to which that resource group or partition should be targeted and deployed, such as virtual target A 420. A web tier component (e.g., a traffic director, such as Oracle Traffic Director) 430 includes a routing information 432, which maps the virtual target for a particular partition to a corresponding target such as a server or cluster, so that requests for that partition are directed to the appropriate target, for example as part of one or more sessions 434.

As further illustrated, the system can include a second or new target cluster B 442, to which partitions can be deployed.

Figure 7:
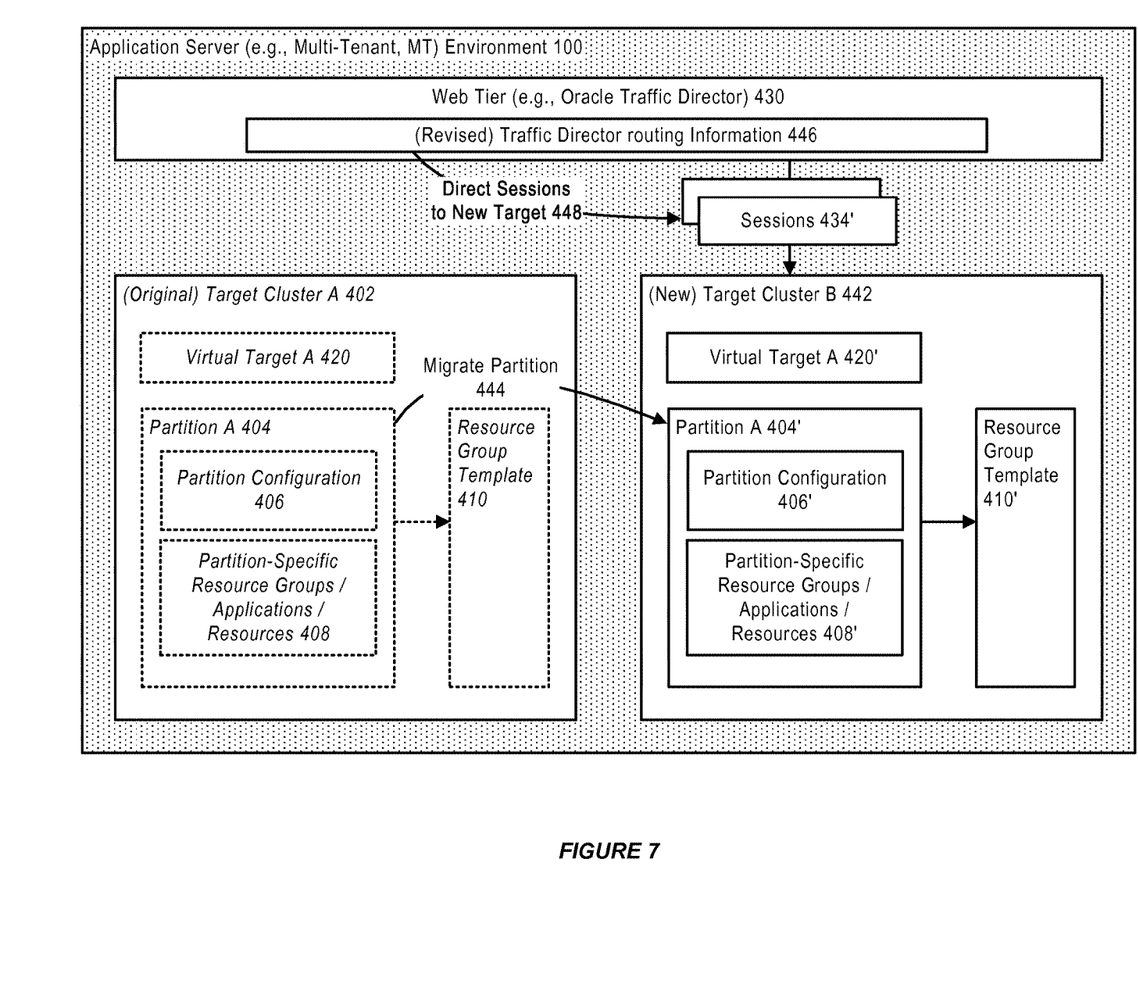
FIG. 7 further illustrates the use of partition migration in an application server, cloud, or other environment, in accordance with an embodiment.

FIG. 7 further illustrates the use of partition migration in an application server, cloud, or other environment, in accordance with an embodiment. As shown in FIG. 7, in accordance with an embodiment, an indication can be received to migrate 444 a particular partition, and any sessions currently operating thereon, from the original target to the new target. Generally, the system will only migrate partitions between targets that are associated with a particular virtual target, for example between different cluster members that are associated with a particular virtual target (and not between different virtual targets).

In response, the particular partition is migrated, including that session information is replicated between the original target and the new target, and the web tier component is provided with a revised routing information 446, which maps the virtual target for the particular partition to the new target, so that subsequent requests for that partition are directed 448 to the new target.

For example, in accordance with an embodiment, the application server environment can inform the traffic director (e.g., OTD), that a particular computer cluster will be going down soon (say, for maintenance or failover reasons), and instruct the traffic director to start sending requests to the expected new cluster. In the meantime, the application server can replicate the session information to the new cluster. Once the session replication is complete, the application server environment can inform the traffic director to remove the downgraded computer cluster from its configuration, which can then also be removed from any resource group targeting.

In accordance with an embodiment, when clusters are used as targets, the system performs live migrations of sessions. When a computer server is used as a target, the live migration functionality may be disabled and a user-controlled manual migration may be used, so the user can be informed of any possible downtime or loss of session information.

Figure 8:
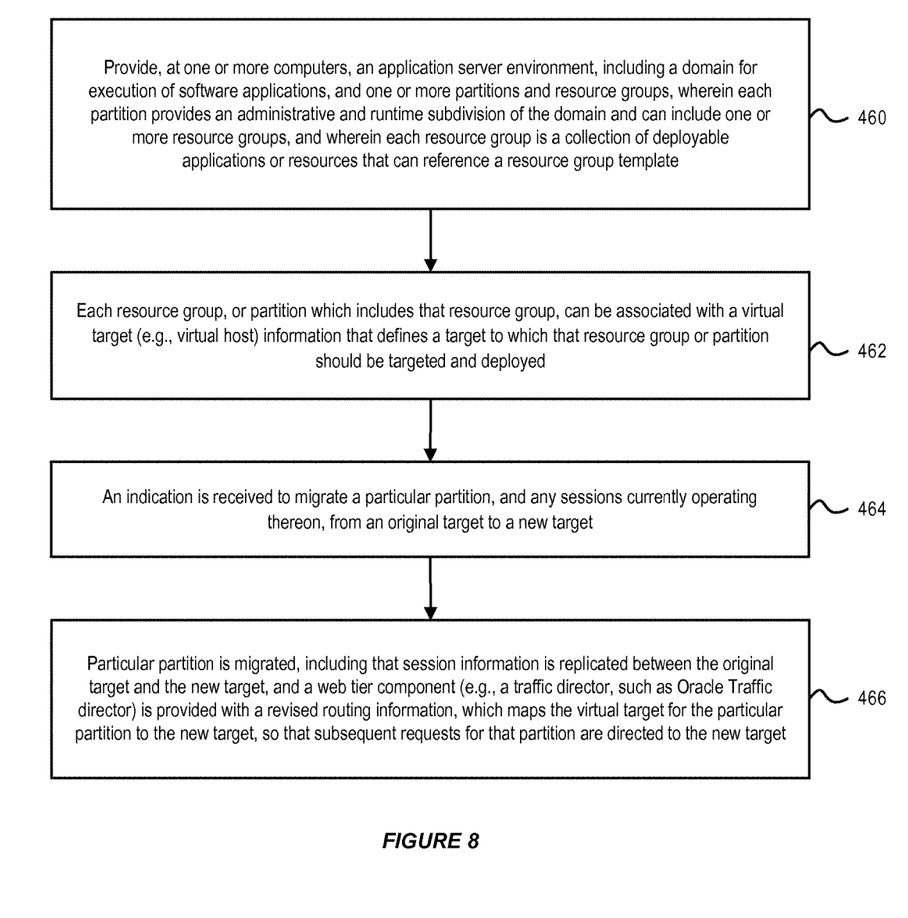
FIG. 8 illustrates a method of using partition migration in an application server, cloud, or other environment, in accordance with an embodiment.

FIG. 8 illustrates a method of using partition migration in an application server, cloud, or other environment, in accordance with an embodiment. As shown in FIG. 8, in accordance with an embodiment, at step 460, an application server environment is provided, including a domain for execution of software applications, and one or more partitions and resource groups, wherein each partition provides an administrative and runtime subdivision of the domain and can include one or more resource groups, and wherein each resource group is a collection of deployable applications or resources that can reference a resource group template.

At step 462, each resource group, or partition which includes that resource group, can be associated with a virtual target (e.g., virtual host) information that defines a target to which that resource group or partition should be targeted and deployed.

At step 464, an indication is received to migrate a particular partition, and any sessions currently operating thereon, from an original target to a new target.

At step 466, the particular partition is migrated, including that session information is replicated between the original target and the new target, and a web tier component (e.g., a traffic director, such as Oracle Traffic director) is provided with a revised routing information, which maps the virtual target for the particular partition to the new target, so that subsequent requests for that partition are directed to the new target.

Example Implementation

Additional details describing an exemplary embodiment are provided below for purposes of illustration.

Live Migration Overview (For http and t3 Traffic)

In accordance with an embodiment, during a live migration, the resource group is running. The Administrator initiates resource group migration using, e.g., a JMX command and specifies the virtual target mbean, existing target, and new target as parameters. The new target is added to virtual target and the resources are deployed to the new target. If a validation error is thrown then the operation is terminated and the user is informed to shut down the source resource group and perform a non-live migration. If the current and new target is a cluster, the clustering APIs for session replication and T3-re-routing are initiated. The LCM APIs for OTD re-routing are initiated which internally determines if OTD is front-ending this resource group(s). Graceful shutdown of applications/resources targeted to old target is initiated using resource group graceful shutdown for specified target. The mbean configuration for virtual target is updated to remove the old target.

Non-Live Migration Overview (For http and t3 Traffic)

In accordance with an embodiment, during a non-live migration, the resource group is not running. The WLS Administrator initiates resource group migration using, e.g., a JMX command and specifies the virtual target mbean, existing target, new target as parameters. The old target is removed from virtual target and new target is added to the virtual target which internally deploys the resources/apps to the new target. The LCM APIs for OTD update are initiated which internally determines if OTD is front-ending this resource group(s).

Resource Group Migration API

In accordance with an embodiment, migration will be initiated using new service PortablePartitionManagerMbean.

ResourceGroupMigrationTask=migrateResourceGroup
(TargetMBean VirtualTarget, TargetMBean currentTarget, TargetMBean newTarget, long timeout);

A validation exception will be thrown if a new migration call is initiated while another migration call is in process for the same virtual target. It is not possible to start two simultaneous migration processes in one resource group. ResourceGroupMigrationTask contains information about state of this long running process.

Adding New Target to Virtual Target

In accordance with an embodiment, in the live migration case the new target is added to the virtual target and the application and resources in the RG are deployed on the new target. If any application or resource does not support multi-targeting then they will throw a validation exception. In this case the migration operation will terminate reporting that the resource group does not support live migration, and that the RG must be shutdown first to do a non-live migration.

Session Replication and T3-Rerouting

In accordance with an embodiment, after the new target is added, an WLS-MT clustering session replication feature can be used to synchronize sessions between old cluster and new cluster, in which session states are copied to some servers in new topology—new Target. After that callback event is send but process continue to synchronize changed sessions. The migration clustering subsystem notifies all connected t3 clients about target change. T3 clients will reconnect to new urls from the target and continue its communication transparently with migrated application. In the case the entire cluster should go down the client should have the ability to reach a well-known address and rediscover a new cluster to route to.

HTTP Traffic Re-Routing Using WLS-MT-Lifecycle

In accordance with an embodiment, migration functionality can leverage the availability of a lifecycle module for migration, which attempts to provide configuration integration across components which were developed independently, in different languages, and using different architectures for configuration and administration.

Seamless Case

In accordance with an embodiment, during seamless cases, the application server will invoke the LCM with a partition migration REST call:

//migrate all partitions associated with the environment
POST/management/lifecycle/latest/environments/
{name}l/partitions/{id}/migrate The payload will contain the details of new cluster where the partition is deployed and phase: start-migrate which would in turn invoke the OTD plugin for configuration change in OTD. Following are the steps happening on OTD side as specified in OTD functional specification.

When a partition migration is initiated, route entry in the associated virtual server's obj.conf configuration for that partition will be modified to list the new origin server pool apart from the existing pool that will handle the new requests. Existing pool (old or drain pool) will handle only the sticky requests to its origin servers.

After this configuration change, for every request to that partition, OTD will first check if it is a sticky request and if the origin server which is expected to process the request is part of the old origin server pool.

If yes, then the request is routed to the specific origin server of the old pool. If that old origin server is not active, it will be routed to another origin server of the old pool.

If the request is not a sticky one, it is routed to the new origin server pool.

The old pool will continue to process the sticky requests until the configuration is modified to remove the old pool entry. It will be the admin's responsibility to turn off the draining of the pool at an appropriate time.

WLS would invoke the LCM with a second partition migration REST call specifying the phase: end-migrate which would in turn invoke the OTD plugin for configuration change in OTD.

Non-Seamless Case

In accordance with an embodiment, during seamless cases, the application server will invoke the LCM with a partition update REST call //update all partitions associated with the environment
POST/management/lifecycle/latest/environments/
{name}/partitions/{id}/update The payload will contain the details of new cluster where the partition is deployed. The LCM would delegate the call to OTD Plugin to update the OTD configuration for that partition.

Graceful Shutdown

In accordance with an embodiment, during this stage, a graceful shutdown on the resource group is initiated for the specified (old) target using the resource group shutdown feature. This would allow handling of inflight work. This will reduce issues with unprocessed state from singleton services such as JMS messages, Running jobs, scheduled tasks, and JTA transactions. Resource containers handle their relative halt/suspend calls in different ways. For example, the datasource container will do a full unregister of it's resources from the transaction manager while the JMS container will not conduct the unregister but will block further requests/processing of messages. All resource containers do conduct unregister calls during undeploy. The unregister behavior of the various resource containers varies, however, there is always at least a grace period whereby the container will wait for pending transactions to complete.

Ensuring all JTA Transactions are Complete

In the common case, when resource group migration occurs, all transactions involving resources involved will have completed before migration occurs. In the rare case that all transactions for a given resource are not complete by the end of the grace period (this would be the case if, e.g., a database became unavailable for an extended period of time at the same time resource group migration was initiated) the resources can still be migrated. This is due to the fact that resource migration is constrained to a single domain and the original server can find the resource in it's new location and conduct recovery.

EJB Stubs

For clustered EJBs and RMIs, RG migration is accomplished using the object's replica-aware stub. When a client makes a call through a replica-aware stub to a service that fails, the stub detects the failure and retries the call on another replica. Should the primary server fail, the client's EJB stub automatically redirects further requests to the secondary application server instance. At this point, the secondary server creates a new EJB instance using the replicated state data, and processing continues on the secondary server. If a client is misdirected (incorrect primary/secondary server information) the session replication framework will employ the session state query protocol to determine the server that is hosting the replica and will send the information back to the client stub. The client stub will then redirect its request to the server hosting the replica.

JMS

If an administrator tries to initiate migration of a resource group which has JMS config, validation exception would be thrown. The administrator will be displayed a message to shut down the resource group before migration. In order to avoid data loss during RG migration, application messages should be completely drained and all pending transactions completed before undeploying or removing a JMS server or SAF Agent. Therefore, it is the job of the administrator to make sure all the draining is done before resource group shutdown is initiated. After the resource group migration is completed, it is the administrator's job to then restart the resource group.

MBean Configuration Change

In accordance with an embodiment, when an application stops or timeout is reached then ResourceGroup's target i.e. virtual target is updated to remove the old cluster. This is final step of migration process.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting partition migration in an application server environment, comprising:
    one or more computers, including an application server that enables deployment and execution of software applications, wherein the application server is associated with a domain configuration that is used at runtime to define a domain for execution of the software applications and a plurality of partitions of the domain,
        wherein each partition, of the plurality of partitions, is associated with a partition configuration, and provides a subdivision of the domain,
        wherein each resource group, of the one or more resource groups, is a collection of deployable applications or resources definable at a domain or partition level, and
        wherein a partition runs an included resource group using a partition-specific configuration, such that an instance of the applications or resources defined within the included resource group is configured specific to the partition;
    wherein each particular resource group, or particular partition that includes the particular resource group, is associated with a virtual target information that defines a target to which the particular resource group or the particular partition is deployed; and
    wherein the application server operates with a web tier component that includes a routing information which maps the virtual target for the particular partition to a corresponding target at a server or cluster, for use in directing requests for the particular partition, including that, when the particular partition is migrated, session state data associated with the particular partition and sessions operating thereon is replicated to a new target, wherein subsequent requests received at the web tier component for the particular partition are directed to the new target.

2. The system of claim 1, wherein the application server is a Java Enterprise Edition application server.

3. The system of claim 1, wherein when the particular partition is migrated, session state data is replicated between an original target and the new target, and the web tier component is provided with a revised routing information, so that the subsequent requests for the particular partition are directed to the new target.

4. The system of claim 1, wherein the system supports multiple tenants, including that the system associates one or more partitions with a tenant, for use by the tenant.

5. The system of claim 1, wherein the application server is provided within a cloud environment.

6. The system of claim 5, wherein the cloud environment includes a plurality of tenants operating within the cloud environment, and wherein each partition of the plurality of partitions is associated with a tenant, for use by the tenant; and
    wherein each different partition associated with a particular tenant environment is associated with a virtual target at which to accept incoming traffic for the particular tenant environment.

7. The system of claim 1, wherein the plurality of partitions includes:
    a first partition associated with a first configuration and a first resource group that defines a first collection of applications or resources accessible via a first virtual target; and
    a second partition associated with the second configuration and a second resource group that defines a second collection of applications or resources accessible via a second virtual target.

8. A method for supporting partition migration in an application server environment, comprising:
    providing, at one or more computers, an application server that enables deployment and execution of software applications, wherein the application server is associated with a domain configuration that is used at runtime to define a domain for execution of the software applications and a plurality of partitions of the domain,
        wherein each partition, of the plurality of partitions, is associated with a partition configuration, and provides a subdivision of the domain,
        wherein each resource group, of the one or more resource groups, is a collection of deployable applications or resources definable at a domain or partition level, and
        wherein a partition runs an included resource group using a partition-specific configuration, such that an instance of the applications or resources defined within the included resource group is configured specific to the partition;
    wherein each particular resource group, or particular partition that includes the particular resource group, is associated with a virtual target information that defines a target to which the particular resource group or the particular partition is deployed; and
    wherein the application server operates with a web tier component that includes a routing information which maps the virtual target for the particular partition to a corresponding target at a server or cluster, for use in directing requests for the particular partition, including that, when the particular partition is migrated, session state data associated with the particular partition and sessions operating thereon is replicated to a new target, wherein subsequent requests received at the web tier component for the particular partition are directed to the new target.

9. The method of claim 8, wherein the application server is a Java Enterprise Edition application server.

10. The method of claim 8, wherein when the particular partition is migrated, session state data is replicated between an original target and the new target, and the web tier component is provided with a revised routing information, so that the subsequent requests for the particular partition are directed to the new target.

11. The method of claim 8, wherein the method supports multiple tenants, including associating one or more partitions with a tenant, for use by the tenant.

12. The method of claim 8, wherein the application server is provided within a cloud environment.

13. The method of claim 12, wherein the cloud environment includes a plurality of tenants operating within the cloud environment, and wherein each partition of the plurality of partitions is associated with a tenant, for use by the tenant; and
   wherein each different partition associated with a particular tenant environment is associated with a virtual target at which to accept incoming traffic for the particular tenant environment.

14. The method of claim 8, wherein the plurality of partitions includes:
   a first partition associated with a first configuration and a first resource group that defines a first collection of applications or resources accessible via a first virtual target; and
   a second partition associated with the second configuration and a second resource group that defines a second collection of applications or resources accessible via a second virtual target.

15. A non-transitory computer readable storage medium, including instructions stored thereon which when read and executed by one or more computers cause the one or more computers to perform the steps comprising:
   providing an application server that enables deployment and execution of software applications, wherein the application server is associated with a domain configuration that is used at runtime to define a domain for execution of the software applications and a plurality of partitions of the domain,
      wherein each partition, of the plurality of partitions, is associated with a partition configuration, and provides a subdivision of the domain,
      wherein each resource group, of the one or more resource groups, is a collection of deployable applications or resources definable at a domain or partition level, and
      wherein a partition runs an included resource group using a partition-specific configuration, such that an instance of the applications or resources defined within the included resource group is configured specific to the partition;
   wherein each particular resource group, or particular partition that includes the particular resource group, is associated with a virtual target information that defines a target to which the particular resource group or the particular partition is deployed; and
   wherein the application server operates with a web tier component that includes a routing information which maps the virtual target for the particular partition to a corresponding target at a server or cluster, for use in directing requests for the particular partition, including that, when the particular partition is migrated, session state data associated with the particular partition and sessions operating thereon is replicated to a new target, wherein subsequent requests received at the web tier component for the particular partition are directed to the new target.

16. The non-transitory computer readable storage medium of claim 15, wherein the application server is a Java Enterprise Edition application server.

17. The non-transitory computer readable storage medium of claim 15, wherein when the particular partition is migrated, session state data is replicated between an original target and the new target, and the web tier component is provided with a revised routing information, so that the subsequent requests for the particular partition are directed to the new target.

18. The non-transitory computer readable storage medium of claim 15, wherein the application server supports multiple tenants, including associating one or more partitions with a tenant, for use by the tenant.

19. The non-transitory computer readable storage medium of claim 15, wherein the application server is provided within a cloud environment.

20. The non-transitory computer readable storage medium of claim 15, wherein the plurality of partitions includes:
   a first partition associated with a first configuration and a first resource group that defines a first collection of applications or resources accessible via a first virtual target; and
   a second partition associated with the second configuration and a second resource group that defines a second collection of applications or resources accessible via a second virtual target.

* * * * *